US 12,412,684 B2

(12) United States Patent
Ma et al.

(10) Patent No.: US 12,412,684 B2
(45) Date of Patent: Sep. 9, 2025

(54) WALL BUSHING

(71) Applicant: JIANGSU SHEMAR ELECTRIC CO., LTD., Jiangsu (CN)

(72) Inventors: Bin Ma, Nantong (CN); Chao Liu, Nantong (CN)

(73) Assignee: JIANGSU SHEMAR ELECTRIC CO., LTD., Jiangsu (CN)

(*) Notice: Subject to any disclaimer, the term of this patent is extended or adjusted under 35 U.S.C. 154(b) by 180 days.

(21) Appl. No.: 18/245,304

(22) PCT Filed: Sep. 7, 2021

(86) PCT No.: PCT/CN2021/116947
§ 371 (c)(1),
(2) Date: Mar. 14, 2023

(87) PCT Pub. No.: WO2022/062894
PCT Pub. Date: Mar. 31, 2022

(65) Prior Publication Data
US 2023/0368947 A1 Nov. 16, 2023

(30) Foreign Application Priority Data

Sep. 24, 2020 (CN) .......................... 202011015775.8
Sep. 24, 2020 (CN) .......................... 202011015783.2
Sep. 24, 2020 (CN) .......................... 202011018229.X

(51) Int. Cl.
*H01B 17/58* (2006.01)
*H01B 17/30* (2006.01)
*H01B 17/36* (2006.01)

(52) U.S. Cl.
CPC ......... *H01B 17/583* (2013.01); *H01B 17/301* (2013.01); *H01B 17/36* (2013.01)

(58) Field of Classification Search
CPC .... H01B 17/583; H01B 17/301; H01B 17/36; H01B 17/12; H01B 17/30; H01B 17/00;
(Continued)

(56) References Cited

U.S. PATENT DOCUMENTS 2,896,008 A * 7/1959 Putz ..................... H01B 17/301
174/152 R
4,767,351 A * 8/1988 Patel .................... H01B 17/265
174/152 R
(Continued)

FOREIGN PATENT DOCUMENTS

CN        101318699 A    12/2008
CN        202487340 U    10/2012
(Continued)

OTHER PUBLICATIONS

European Patent Office, Extended Search Report issued in corresponding Application No. 21871266.9, dated Jul. 26, 2024, 9 pp.
(Continued)

*Primary Examiner* — Angel R Estrada
(74) *Attorney, Agent, or Firm* — Taft Stettinius & Hollister LLP

(57) ABSTRACT

A wall bushing, comprising a head assembly, a conductive rod, and a connecting terminal sealing and covering the head assembly and the conductive rod. The connecting terminal and the conductive rod are electrically connected. The head assembly includes a transition tank and a transition plate that are connected to each other. An upper end of the transition tank is provided with a first through hole, and a lower end of the transition tank is hole-through. The transition plate is provided with a second through hole. The conductive rod extends through the first through hole and the second through hole. The transition tank and the transition plate are
(Continued)

fixedly connected such that an accommodation cavity is formed around the conductive rod and in the transition tank.

11 Claims, 13 Drawing Sheets

(58) Field of Classification Search
CPC .... H01B 17/56; H02G 3/0468; H02G 3/0462; H02G 3/04; H02G 3/00; H02G 3/02
USPC ......... 174/152 R, 153 R, 137 R, 138 R, 174, 174/11 BH, 14 BH, 12 BH, 30, 31 R, 142; 16/2.1, 2.2
See application file for complete search history.

(56) References Cited

U.S. PATENT DOCUMENTS

| | | | | |
|---|---|---|---|---|
| 7,812,266 | B2* | 10/2010 | Rocks | H01B 17/265 16/2.2 |
| 8,003,891 | B2* | 8/2011 | Rocks | H01B 17/28 16/2.2 |

FOREIGN PATENT DOCUMENTS

| | | | |
|---|---|---|---|
| CN | 104505784 | A | 4/2015 |
| CN | 105977887 | A | 9/2016 |
| CN | 107634495 | A | 1/2018 |
| CN | 107654738 | A | 2/2018 |
| CN | 107706854 | A | 2/2018 |
| CN | 108492945 | A | 9/2018 |
| CN | 208738735 | U | 4/2019 |
| CN | 110676779 | A | 1/2020 |
| CN | 110729684 | A | 1/2020 |
| CN | 111180165 | A | 5/2020 |
| CN | 112186679 | A | 1/2021 |
| CN | 112310912 | A | 2/2021 |
| CN | 112310913 | A | 2/2021 |
| CN | 214204810 | U | 9/2021 |
| CN | 214204811 | U | 9/2021 |
| DE | 102008000494 | A1 | 9/2009 |
| EP | 3413319 | A | 12/2018 |
| WO | 2020174011 | A1 | 9/2020 |

OTHER PUBLICATIONS

Chinese Patent Office, Office Action issued in corresponding Application No. 202011018229.X, dated Aug. 30, 2024, 6 pp.
Chinese Patent Office, Office Action issued in corresponding Application No. 202011015775.8, dated Aug. 30, 2024, 6 pp.
International Search Report for corresponding Application No. PCT/CN2021/116947 dated Dec. 1, 2021, 7 pages.
Written Opinion for corresponding Application No. PCT/CN2021/116947 dated Dec. 1, 2021, 4 pages.
Chinese Patent Office, Second Office Action issued in corresponding Application No. 202011015775.8, dated Mar. 27, 2025, 12 pp.

* cited by examiner

WALL BUSHING

CROSS REFERENCE TO RELATED APPLICATION

This application is a national stage for International Application PCT/CN2021/116947, filed on Sep. 7, 2021, which claims the priority benefit of Chinese Patent Application No. 202011015783.2, filed on Sep. 24, 2020, Chinese Patent Application No. 202011018229.X, filed on Sep. 24, 2020, and Chinese Patent Application No. 202011015775.8, filed on Sep. 24, 2020. The entireties of these applications are incorporated by reference herein for all purposes.

TECHNICAL FIELD

The present disclosure relates to the technical field of power transmission insulation equipment, in particular to a wall bushing.

BACKGROUND

In a direct current (DC) power transmission and transformation project, a wall bushing, as the only electrical component connecting the inside and outside of a valve hall, carries the full voltage and current of all lines, and thus the performance reliability of the wall bushing is related to the operational safety and stability of the all lines.

At present, most of head assemblies of the existing wall bushings are corrugated tubes. A conductive rod is connected to the corrugated tube in an axial sealing manner, and the conductive rod passes through the corrugated tube to be directly electrically connected to external components. Specifically, an end of the conductive rod is fixed to an end of the wall bushing, the other end of the conductive rod is fixed to the corrugated tube and extends out of the corrugated tube for electrical connection with external components. The corrugated tube, which has elasticity, provides tensioning force to the conductive rod to maintain the tension of the conductive rod. When the conductive rod is heated and elongated, the corrugated tube can be elastically deformed, so that the conductive rod remains straight without stress bending. However, there are the following problems: when a head assembly of the wall bushing adopts the corrugated tube, if the axial seal is used, due to the long-term friction of thermal expansion and contraction, the long-term reliability of the dynamic seal cannot be guaranteed, and thus the wall bushing is prone to gas leakage; if the axial seal is not used, an external transition tank is required, and a soft connection is required to be used between a connecting terminal and the conductive rod, and the through-current capability is limited. In addition, the expensive corrugated tube increases the manufacturing cost of the wall bushing, and metal chips are easily generated due to friction between the conductive rod and the head assembly, resulting in internal discharge.

SUMMARY

Based on the deficiencies of the prior art, an object of the present disclosure is to provide a wall bushing, which has a simple structure, saves the corrugated tube structure, avoids the use of an axial dynamic sealing device, greatly improves the sealing reliability of the wall bushing, and reduces production costs.

For realizing the above-mentioned object of the present disclosure, the technical means adopted in the present disclosure are as follows. A wall bushing includes a head assembly, a conductive rod, and a connecting terminal sealing and covering the head assembly and the conductive rod. The connecting terminal is electrically connected to the conductive rod. The head assembly includes a transition tank and a transition plate that are connected to each other. An upper end of the transition tank is provided with a first through hole, and a lower end of the transition tank is hole-through. The transition plate is provided with a second through hole. The conductive rod extends through the first through hole and the second through hole. The transition tank and the transition plate are fixedly connected so that an accommodating cavity is formed around the conductive rod and in the transition tank. The wall busing has a simple structure, saves the corrugated tube structure, avoids the use of an axial dynamic sealing device, greatly improves the sealing reliability of the wall bushing, and reduces production costs.

Preferably, the wall bushing further includes a protective cover. The protective cover is a ring-shaped casing that is hole-through in an up-down direction. The protective cover surrounds the second through hole, and is mounted at a lower end of the head assembly. The conductive rod extends through the first through hole, the second through hole, and the protective cover. The arrangement of the protective cover further prevents possible metal chips or other debris from entering the main insulating cavity of the wall bushing, improving the operation reliability of the wall bushing.

Preferably, the protective cover is made of metal. A gap is formed between the protective cover and the conductive rod. The generation of metal chips due to the secondary friction between the protective cover and the conductive rod can be prevented, and the protective cover made of metal plays a shielding role to a certain extent, which improves the operation reliability of the wall bushing.

Preferably, the wall bushing further includes a protective corrugated tube. The protective corrugated tube is a ring-shaped casing that is hole-through in an up-down direction. The protective corrugated tube is provided with an upper through hole and a lower through hole. The conductive rod extends through the first through hole, the second through hole, the upper through hole, and the lower through hole. The protective corrugated tube is provided with an upper connecting end around the upper through hole. The upper connecting end surrounds the second through hole and is fixedly connected to a lower end of the head assembly. The lower through hole is fixedly connected to the conductive rod. The arrangement of the protective corrugated tube further prevents possible metal chips or other debris from entering the main insulating cavity of the wall bushing, thereby improving the operation reliability of the wall bushing.

Preferably, the upper connecting end is a flange plate extending along a radial direction of the upper through hole. The flange plate is attached to and fixedly connected to the lower end of the head assembly. The flange plate and the head assembly are connected in a planar contact with each other, which is convenient for mounting and reliable in structure.

Preferably, a mounting hole is arranged on the flange plate. A passage is arranged between the mounting hole and the upper through hole for providing a communication of the mounting hole with the upper through hole. A filter element is mounted in the mounting hole. The filter element is configured for only gas exchange between an inside of the protective corrugated tube and an outside of the protective corrugated tube. During the process of inflating and deflating of the wall bushing, only gas is allowed to pass through, and internal impurities, metal chips and the like cannot enter the main insulating cavity through the filter element.

Preferably, a diameter of the lower through hole is less than a minimum inner diameter of the protective corrugated tube. A lower connecting end is arranged around the lower through hole. A first round nut and a second round nut are arranged on two sides of the lower connecting end, respectively. The first round nut and the second round nut are respectively threadedly connected with the conductive rod to clamp the lower connecting end so that the protective corrugated tube is fixedly connected to the conductive rod. The protective corrugated tube is fixedly connected to the conductive rod, so that on the one hand, no gap is formed between the protective corrugated tube and the conductive rod, which ensures that impurities and metal chips in the protective corrugated tube cannot enter the main insulating cavity; on the other hand, the conductive rod is deformed due to thermal expansion and cold contraction, and the protective corrugated tube has a certain space for elastic deformation, and a size of the protective corrugated tube is capable of changing accordingly with the deformation of the conductive rod, which ensures stable connections of the various components of the wall bushing.

Preferably, a plurality of circular grooves is arranged on a sidewall of the transition tank and surrounds the conductive rod. The circular groove functions as a particle trap to absorb metal particles in the transition tank, and ensures the stability of the electrical property of the head portion of the wall bushing.

Preferably, the lower end of the transition tank extends to form a first connecting part along an outer periphery of the transition tank. The first connecting part is in a sealed connection with the transition plate. The arrangement of the first connecting part facilitates the fixed connection between the transition tank and the transition plate. The sealed connection ensures that the interior of the transition tank is not intruded by moisture, and avoids affecting electrical properties.

Preferably, a non-metallic lining is arranged on an inner wall of the first through hole and/or an inner wall of the second through hole, which prevents the metal chips from being generated due to friction between the conductive rod and the transition plate, and between the conductive rod and the transition tank, thereby improving the operation reliability of the wall bushing.

Preferably, the connecting terminal includes a connecting part, an accommodating part, and a second connecting part that are sequentially arranged. The accommodating part is configured for accommodating an end of the conductive rod, and is electrically connected to the conductive rod. The second connecting part is in a sealed connection with the upper end of the transition tank. The connecting terminal is an electrical connection component of the wall bushing and is used for electrical connection with other devices. The arrangement of the second connecting part facilitates the fixed connection of the connecting terminal to the transition tank.

Preferably, contact springs are arranged at the end of the conductive rod. The contact springs abut against an inner wall of the accommodating part; and a gap is formed between the accommodating part and the end of the conductive rod in an axial direction of the conductive rod. The contact springs are in close contact with the connecting terminal and the end of the conductive rod at the same time, so that the electrical connection between the connecting terminal and the end of the conductive rod is stable, and thus the equipotential of the head assembly is maintained, and the heating problem of the head portion is solved. The gap is formed between the accommodating part and the end of the conductive rod in the axial direction of the conductive rod, which is capable of absorbing the deformation due to thermal expansion and contraction, of the conductive rod, and prevent the conductive rod from being bent due to the fixed connection.

Preferably, an upper surface and/or a lower surface of the transition plate is provided with a protruding ring around the second through hole. The arrangement of the protruding ring increases the area supporting the conductive rod, which improves the bending resistance of the conductive rod.

Preferably, the wall bushing further includes a hollow insulator. The hollow insulator is in a sealed connection with the transition plate. For example, A flange of the hollow insulator is in a sealed connection with a lower surface of the transition plate. The conductive rod extends through the hollow insulator. The hollow insulator provides insulation protection for the conductors inside the wall bushing.

DETAILED DESCRIPTION OF THE EMBODIMENTS

As required, specific embodiments of the present disclosure will be disclosed herein. However, it should be understood that the embodiments disclosed herein are merely typical examples of present disclosure, which can be embodied in various forms. Therefore, specific details disclosed herein are not to be considered to be limited, but merely as a basis for the claims and as a representative basis for teaching one skilled in the art to variously employ present disclosure in any appropriate way in practice, which includes adopting various features disclosed herein and combining features that may not be expressly disclosed herein.

Figure 1:
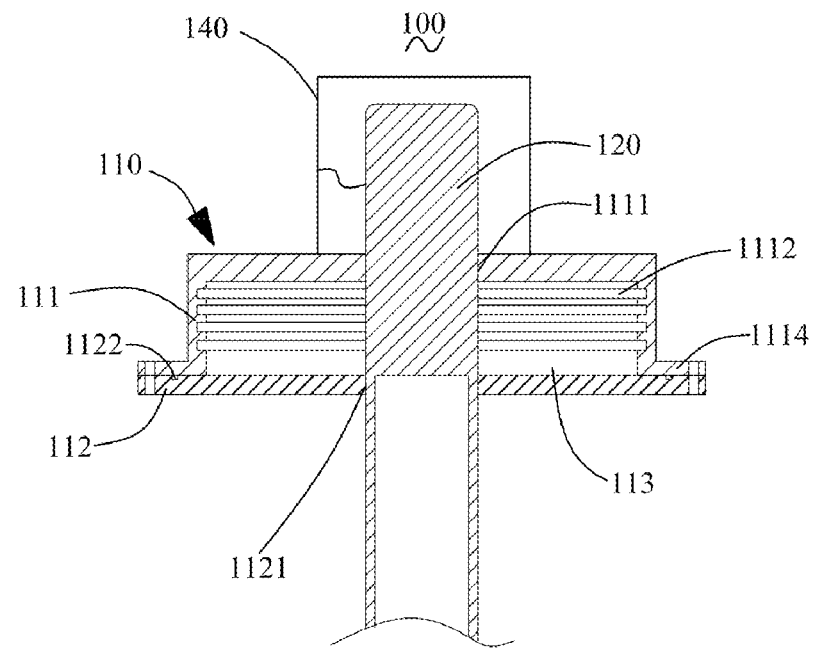
FIG. 1 is a partial cross-sectional view of a wall busing 100 according to an embodiment of the present disclosure.

In an embodiment, as shown in FIG. 1, a wall bushing 100 includes a head assembly 110, a conductive rod 120, and a connecting terminal 140 that seals and covers the head assembly 110 and the conductive rod 120 (only schematically illustrated in the figure). The connecting terminal 140 is electrically connected to the conductive rod 120. The head assembly 110 includes a transition tank 111 and a transition plate 112 that are connected to each other. An upper end of the transition tank 111 is provided with a first through hole 1111, and a lower end of the transition tank 111 is hole-through. The transition plate 112 is provided with a second through hole 1121. The conductive rod 120 extends through the first through hole 1111 and the second through hole 1121. The transition tank 111 and the transition plate 112 are fixedly connected, so that an accommodating cavity 113 is formed around the conductive rod 120 and in the transition tank 111. The wall bushing 100 has a simple structure, and has core components that are the transition tank 111 and the transition plate 112. The arrangement of the transition tank 111 saves the structure of a corrugated tube. As long as the transition tank 111 is arranged in a sealing manner, that is, sealing measures are applied at the outside of the transition tank 111, the use of an axial dynamic sealing device can be avoided between the transition tank 111 and the conductive rod 120, which greatly improves the sealing reliability of the wall bushing 100 and reduces the production cost at the same time. It is particularly worth noting that, it is sufficient that the connecting terminal 140 that seals and covers the head assembly 110 and the conductive rod 120, the conductive rod 120 are connected with an electrical connection. The electrical connection may be implemented to be a direct contact, or a connection of internal conductors. A shape and a configuration of the connecting terminal 140 is not specifically limited herein.

It should be noted that, in this embodiment, the upper end and the lower end of the head assembly 110 are provided in the concept of relative positions. Along an axial direction of the overall structure of the wall bushing 100, an end close to the head assembly 110 is the upper end, and an end in a direction away from the head assembly 110 is the lower end. In other embodiments, the definitions of "upper" and "lower" are also provided according to this standard.

In other embodiments, the head assembly may have an integrated cavity structure, as long as it meets the requirements of the rigid assembly, that is, under the interference of external heat conditions, the head assembly will not be deformed and displaced. In this way, it can be ensured that the head assembly will not be deformed and displaced due to the length change of the conductive rod, thereby maintaining the stability of the overall structure of the wall bushing.

In this embodiment, the transition plate 112 is a planar plate. In other embodiments, the shape of the transition plate is not specifically limited.

In this embodiment, the transition tank 111 is a cylindrical tank, and has the upper end that is provided with the first through hole 1111, and the lower end is hole-through and forms a cylindrical cavity. The first through hole 1111 is in communication with the cylindrical cavity. After the transition tank 111 is fixedly connected to the transition plate 112 and the conductive rod 120 extends through the first through hole 1111 and the second through hole 1121, the circular cavity surrounding the outside the conductive rod 120 forms the accommodating cavity 113.

In other embodiments, the shape of the transition tank may also be non-cylindrical, as long as it can be adapted to the connected components.

In this embodiment, a plurality of circular grooves 1112 is arranged on a sidewall of the transition tank 111 and surrounds the conductive rod 120. The circular groove 1112 functions as a particle trap to absorb metal particles in the transition tank 111, so that the stability of the electrical properties of the head portion of the wall bushing 100 is ensured.

In this embodiment, four circular grooves 1112 are provided. In other embodiments, the number of circular grooves is not limited and is reasonably designed according to a size of the inner wall of the transition tank. However, it can be understood that the more the number of circular grooves and the denser the circular grooves, the better the effect of adsorbing metal particles.

In this embodiment, the circular groove 1112 is in the shape of a rectangular groove. In other embodiments, the circular groove may also be an arc groove or an irregularly shaped groove, and the shape of the circular groove is not specifically limited herein.

In this embodiment, the lower end of the transition tank 111 extends along an outer periphery of the transition tank 111, so as to form a first connecting part 1114, and the first connecting part 1114 is in a sealed connection with the transition plate 112. The arrangement of the first connecting part 1114 facilitates the fixed connection between the transition tank 111 and the transition plate 112. The sealed connection can ensure that the interior of the transition tank 111 is not intruded by moisture, so as to avoid affecting electrical properties.

In this embodiment, a first sealing groove 1122 is arranged on the transition plate 112. A first sealing ring (not shown in figures) is arranged in the first sealing groove 1122. In other embodiments, the first sealing groove may also be arranged on the first connecting part, or both the first connecting part and the transition plate are provided with a sealing groove to mount a sealing ring.

In this embodiment, the through holes corresponding to each other are arranged on the first connecting part 1114 and the transition plate 112, and the first connecting part 1114 and the transition plate 112 are fixedly connected by means of bolt connection (not shown in figures). In other embodiments, the first connecting part and the transition plate may be connected by gluing, welding, or a combination of the above fixed connections.

In this embodiment, a portion of the conductive rod 120 located at and above the transition tank 111 is a solid structure, and a portion of the conductive rod 120 located below the transition tank 111 is a hollow structure. The solid structural portion of the conductive rod 120 has good electrical conductivity, and the hollow structural portion of the conductive rod 120 reduces the weight of the conductive rod 120, thereby reducing the overall weight of the wall bushing 100 and reducing the cost.

In other embodiments, the conductive rod can be a fully solid structure, or a completely hollow structure. In the case that the conductive rod is the completely hollow structure, the portion of the hollow conductive rod that is located at and above the transition tank is arranged to have a larger wall thickness.

The wall bushing 100 according to the present embodiment is simple in structure, and has the core components that are the transition tank 111 and the transition plate 112. The arrangement of the transition tank 111 saves the structure of the corrugated tube. As long as the transition tank 111 can be arranged in a sealing manner, that is, sealing measures are applied at the outside of the transition tank 111, the use of an axial dynamic sealing device can be avoided between the transition tank 111 and the conductive rod 120, which greatly improves the sealing reliability of the wall bushing 100 and reduces the production cost at the same time.

Figure 2:
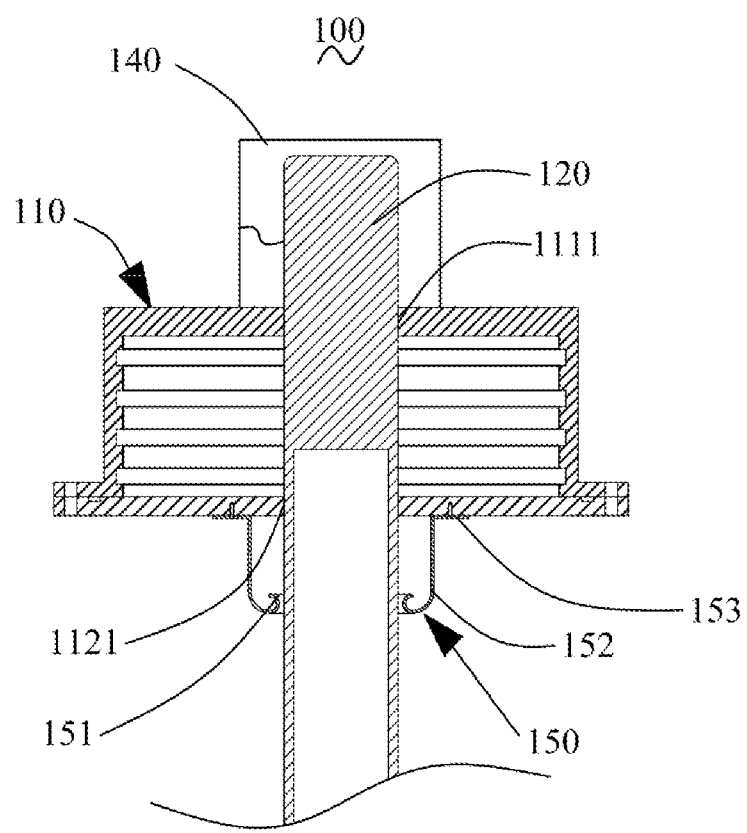
FIG. 2 is a partial cross-sectional view of a wall busing 100 according to another embodiment of the present disclosure.

In an application scenario, as shown in FIG. 2, the wall bushing 100 further includes a protective cover 150. The protective cover 150 is a ring-shaped casing 152 that is hole-through in an up-down direction. The protective cover 150 surrounds the second through hole 1121, and is mounted at the lower end of the head assembly 110. The conductive rod 120 extends through the first through hole 1111, the second through hole 1121, and the protective cover 150. The connecting terminal 140 is electrically connected to the conductive rod 120, and seals and covers the head assembly 110 and the conductive rod 120. The arrangement of the protective cover 150 further prevents possible metal chips or other debris from entering the main insulating cavity of the wall bushing 100, improving the operation reliability of the wall bushing 100.

In this embodiment, the protective cover 150 is made of metal, and a gap is formed between the protective cover 150 and the conductive rod 120. The arrangement of the gap can prevent the generation of metal chips due to the secondary friction between the protective cover 150 and the conductive rod 120. The protective cover 150 made of metal can also play a shielding role to a certain extent, improving the operation reliability of the wall bushing 100.

In other embodiments, the protective cover may also be made of non-metallic material, as long as the generation of metal chips due to the secondary friction between the protective cover and the conductive rod can be prevented.

In this embodiment, an edge curl 151 is formed on a side of a lower end of the protective cover 150 close to the conductive rod 120, and there is a gap between the edge curl 151 and the conductive rod 120. Due to the arrangement of the edge curl 151, the metal chips can remain in the edge curl 151. Further, there is no sharp friction between the edge curl 151 and the conductive rod 120, which can prevent more unwanted metal chips from being generated due to accidental contact.

In this embodiment, the upper end of the protective cover 150 surrounds the outer periphery of the ring-shaped casing 152 of the protective cover 150, and extends outward to form a circular cover connecting part 153. The cover connecting part 153 is attached to the lower end of the head assembly 110. The lower end of the head assembly 110 is provided with a threaded hole, and a through hole corresponding to the above threaded hole is arranged on the cover connecting part 153, so that the cover connecting part 153 and the lower end of the head assembly 110 are fixed by means of bolt connection.

In other embodiments, a threaded hole may be arranged at the cover connecting part, and a through hole corresponding to the above threaded hole is arranged at the lower end of the head assembly. In this way, the cover connecting part and the lower end of the head assembly can be also fixed by means of bolt connection. It should be noted that since there is no fixed connection between the conductive rod and the head assembly, the arrangement of the through hole and the threaded hole for the bolt connection does not affect the assembly sequence of the wall bushing.

In this embodiment, the protective cover 150 is a circular casing. In other embodiments, the shape of the ring-shaped casing may also be configured to other shapes, such as square ring, oval ring, and which is not limited to the circular ring.

In other embodiments, the cover connecting part and the lower end of the head assembly may be connected by gluing, welding, etc., as long as the effective connection between the cover connecting part and the lower end of the head assembly can be ensured.

Figure 3:
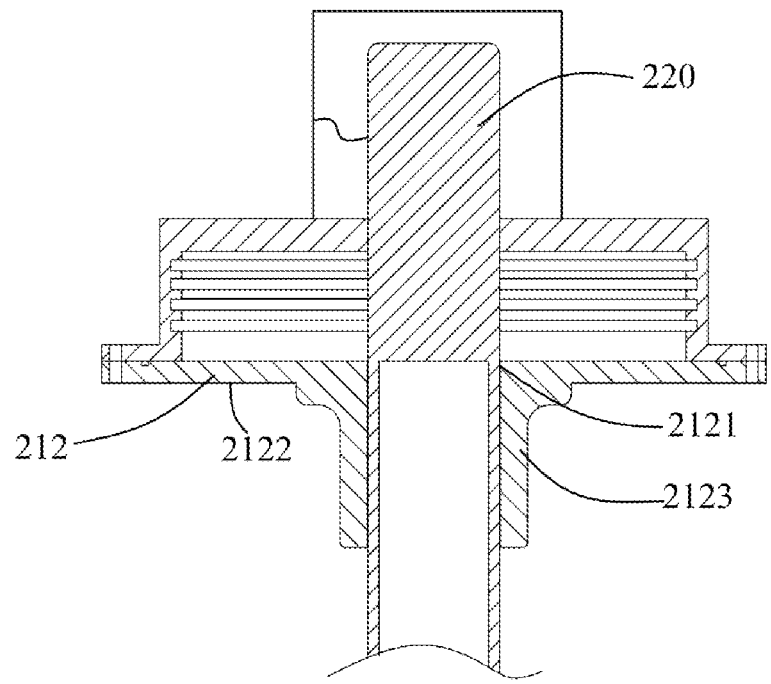
FIG. 3 is a partial cross-sectional view of a wall busing 200 according to an embodiment of the present disclosure.

In another embodiment, as shown in FIG. 3, a wall bushing 200 is provided. A lower surface 2122 of a transition plate 212 is provided with a protruding ring 2123 around a second through hole 2121. The arrangement of the protruding ring 2123 increases the area supporting the conductive rod 220, which improves the bending resistance of the conductive rod 220.

Figure 4:
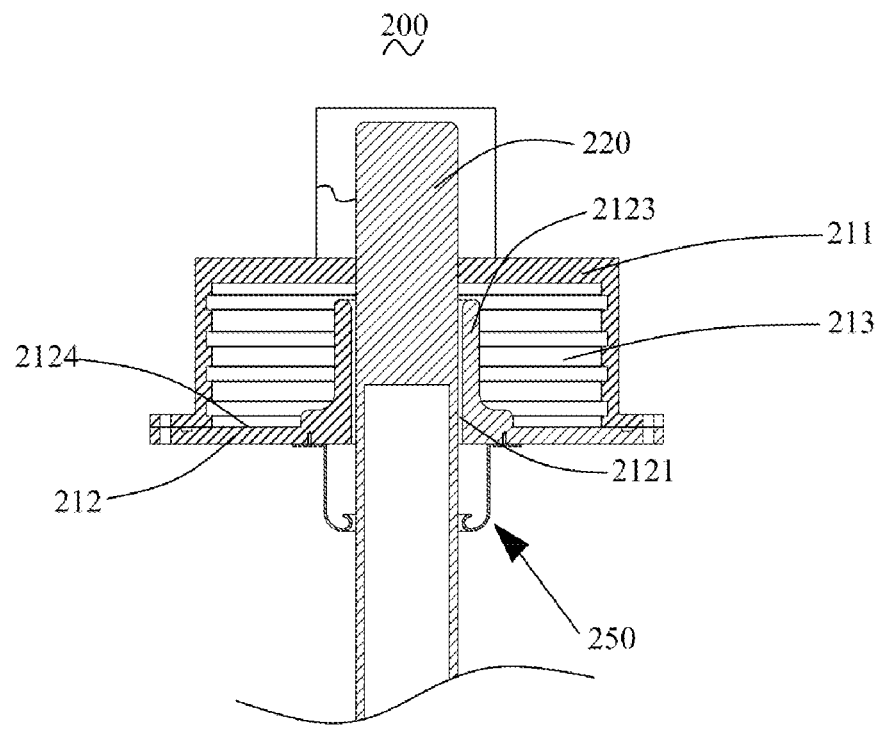
FIG. 4 is a partial cross-sectional view of a wall busing 200 according to another embodiment of the present disclosure.

In yet another embodiment, the protruding ring 2123 may be arranged on an upper surface of the transition plate 212. As shown in FIG. 4, an upper surface 2124 of the transition plate 212 is provided with the protruding ring 2123 around the second through hole 2121. The arrangement of the protruding ring 2123 increases the area supporting the conductive rod 220, which improves the bending resistance of the conductive rod 220.

In this embodiment, the protruding ring 2123 is arranged in an accommodating cavity 213 of the head assembly 210. The height of the protruding ring 2123 does not exceed the height of the transition tank 211, that is, a gap is formed between an upper end surface of the protruding ring 2123 and an inner wall of the transition tank 211, and the upper end surface of the protruding ring 2123 is not in direct contact with the inner wall of the transition tank 211. In this way, it can be ensured that under the action of heat, even if the protruding ring 2123 undergoes expansion deformation, the protruding ring 2123 will not contact the inner wall of the transition tank 211, and will not deform the transition tank 211, ensuring the reliability of the overall structure of the wall bushing 200.

The wall bushing 200 further includes a protective cover 250. The material and structure of the protective cover 250 are the same as those of the aforementioned protective cover 150, and which is not repeated herein.

Alternatively, in other embodiments, both the upper surface and the lower surface of the transition plate may be provided with protruding rings. Essentially, the arrangement of protruding rings is intended to expand the contact area of the conductive rod and the transition plate, and then increase the area supporting the conductive rod, thereby improving the bending resistance of the conductive rod.

Since the wall bushing 200 according to this embodiment is provided with the protruding ring 2123, the bending resistance of the conductive rod 220 is improved, thereby improving the overall reliability of the wall bushing 200.

Figure 5:
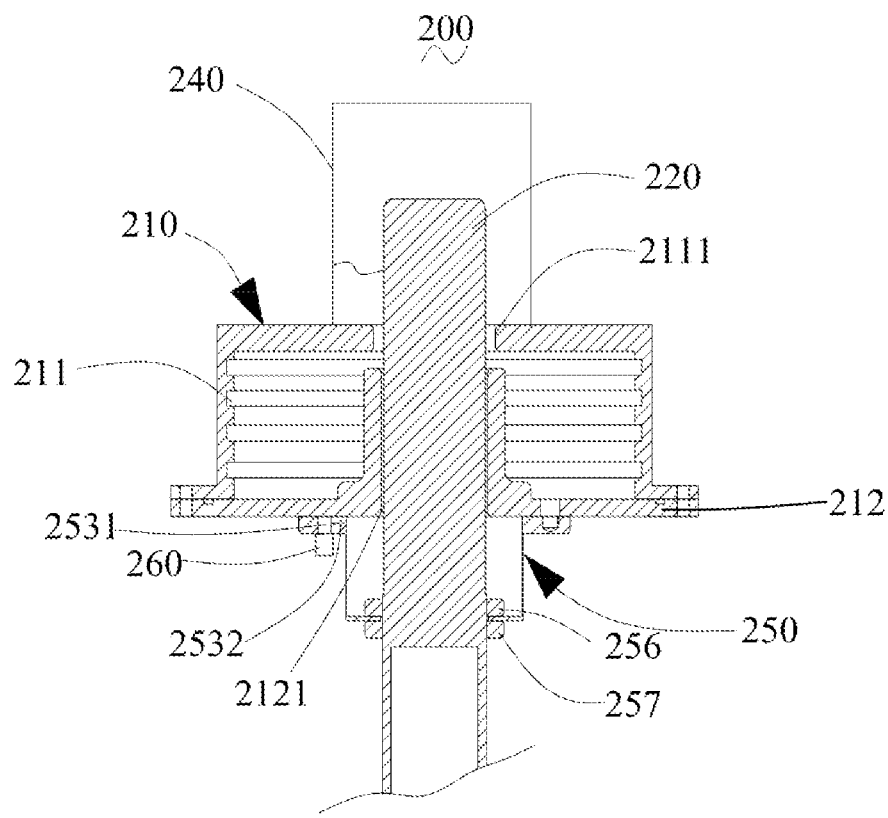
FIG. 5 is a partial cross-sectional view of a wall busing 200 according to yet another embodiment of the present disclosure.
Figure 6:
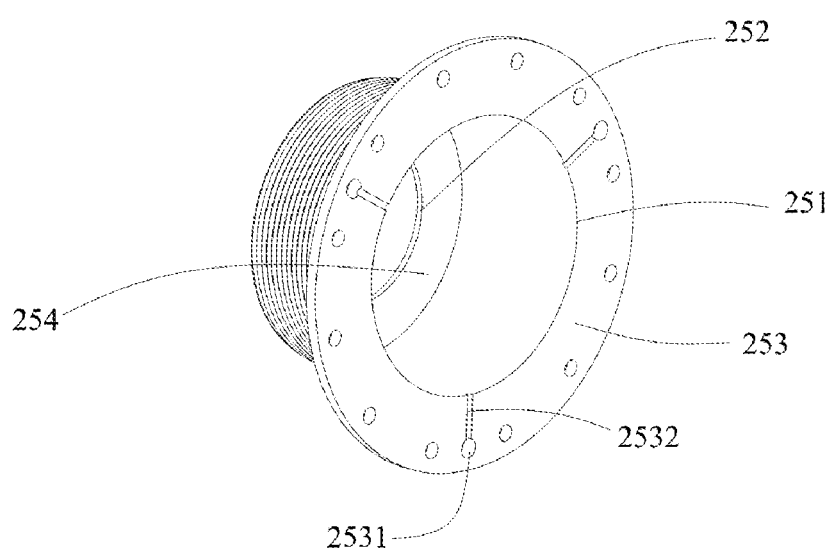
FIG. 6 is a perspective schematic view of a protective corrugated tube 250 according to an embodiment of the present disclosure.
Figure 7:
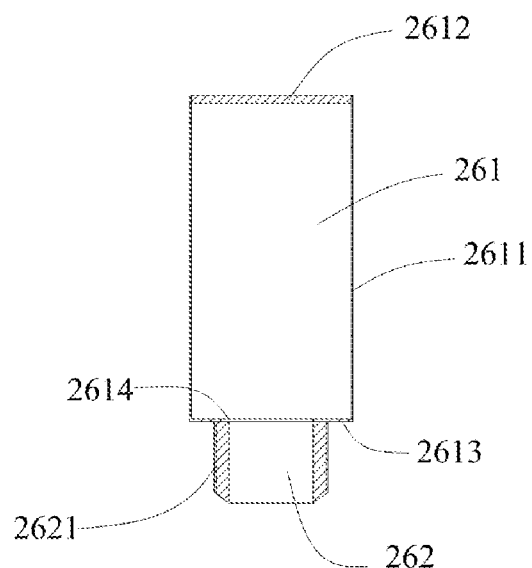
FIG. 7 is an overall cross-sectional view of a filter element 260 according to an embodiment of the present disclosure.

Further, in another application scenario, as shown in FIGS. 5 to 7, the wall bushing 200 includes a protective corrugated tube 250 instead of the aforementioned protective cover 250. Specifically, the protective corrugated tube 250 is a ring-shaped casing that is hole-through in an up-down direction. The protective corrugated tube 250 is provided with an upper through hole 251 and a lower through hole 252. The conductive rod 220 extends through the first through hole 2111, the second through hole 2121, the upper through hole 251 and the lower through hole 252. The protective corrugated tube 250 is provided with an upper connecting end 253 around the upper through hole 251. The upper connecting end 253 surrounds the second through hole 2121 and is fixedly connected to the lower end of the head assembly 210. The lower through hole 252 is fixedly connected to the conductive rod 220. A connecting terminal 240 is electrically connected to the conductive rod 220, and seals and covers the head assembly 210 and the conductive rod 220. The wall bushing 200 has a simple structure. The conventional corrugated tube structure is replaced by the head assembly 210, which avoids the use of an axial dynamic sealing device, greatly improves the sealing reliability of the wall bushing 200, and reduces production costs. The arrangement of the protective corrugated tube 250 further prevents possible metal chips or other debris from entering the main insulating cavity of the wall bushing 200, thereby improving the operation reliability of the wall bushing 200.

In this embodiment, the protective corrugated tube 250 is a circular casing. In other embodiments, the shape of the ring-shaped casing of the protective corrugated tube may also be configured to other shapes, such as square ring, oval ring, and which is not limited to the circular ring.

In this embodiment, the upper connecting end 253 is a flange plate 253 extending outward along a radial direction of the upper through hole 251. The flange plate 253 is attached to and fixedly connected to the lower end of the head assembly 210. The flange plate 253 and the head assembly 210 are in a planar contact with each other, which is convenient for mounting and reliable in structure.

In other embodiments, the structure of the upper connecting end is not limited thereto. For example, the structure of the upper connecting end may be a circular ring structure or a sawtooth structure extending along the upper through hole, and the lower end of the head assembly is provided with a groove matching the circular ring structure or the sawtooth structure for insertion. An adhesive is used to aid in fixation.

In this embodiment, a mounting hole 2531 is arranged on the flange plate 253, and a passage 2532 is arranged between the mounting hole 2531 and the upper through hole 251 for providing a communication of the mounting hole 2531 with the upper through hole 251. A filter element 260 is mounted in the mounting hole 2531. The filter element 260 is used for only gas exchange between the inside of the protective corrugated tube 250 and the outside of the protective corrugated tube 250. During the process of inflating and deflating of the wall bushing 200, the filter element 260 only allows gas to pass through, and internal impurities, metal chips and the like cannot enter the main insulating cavity through the filter element 260.

In this embodiment, three mounting holes 2531 are provided, and three corresponding filter elements 260 are provided. In other embodiments, as long as the number of mounting holes is equal to the number of filter elements, the specific number and the distance between different mounting holes are not specifically limited.

In this embodiment, the mounting hole 2531 is a through hole, and the passage 2532 is arranged on a surface of the flange plate 253, and is a linear groove communicating the mounting hole 2531 with the upper through hole 251. The passage 2532 is a passage for gas exchange between the inside of the protective corrugated tube 250 and the outside of the protective corrugated tube 250.

In other embodiments, the mounting hole may not be a through hole, a passage is arranged between the bottom of the mounting hole and the upper through hole. The passage is arranged in the inside of the flange plate, and cannot be observed from the surface of the flange plate. That is, the shape and location of the passage are not limited, as long as the purpose of gas exchange between the inside of the protective corrugated tube and the outside of the protective corrugated tube can be achieved.

In this embodiment, the filter element 260 includes a filter part 261 and a filter element connecting part 262. The filter part 261 is a columnar metal sintered mesh. A side surface 2611 and a top surface 2612 of the filter part 261 are designed in one piece, and seamlessly connected. A bottom surface 2613 of the filter part 261 is provided with a through hole 2614. The filter element connecting part 262 is arranged around the through hole 2614. The filter element connecting part 262 is a cylindrical structure that is hole-through in an up-down direction, and has an end connected to the through hole 2614, and the other end that is an outlet. A thread 2621 is arranged on the filter element connecting part 262. The mounting hole 2531 is provided with a thread matched with the thread 2621. When the filter element connecting part 262 is mounted in the mounting hole 2531, the part of the filter element 260 exposed outside the mounting hole 2531 is designed in one piece and seamlessly connected.

In this embodiment, the filter element 260 is a titanium rod filter element 260 with metal mesh structure. The titanium rod filter element 260 is a kind of porous filter element, which is made of industrial high-purity titanium through the following steps. That is, the industrial high-purity titanium is processed by sieving, cooling, etc., and then isostatic pressing, and then sintered at high temperature and high vacuum, so as to obtain the porous filter element. The titanium rod filter element 260 has excellent properties such as high corrosion resistance, high temperature resistance, high strength, easy assurance of filtration accuracy, and easy regeneration.

In this embodiment, the titanium rod filter element 260 has the following characteristics: uniform structure, narrow pore size distribution, high separation efficiency; high porosity, low filtration resistance, high penetration efficiency; high temperature resistance (generally, normal use below 280° C.); good chemical stability, acid and alkali corrosion resistance, oxidation resistance; no particle shedding; good mechanical properties, easy to operate.

In other embodiments, the filter element can also be other sintered mesh materials such as PTFE (polytetrafluoroethylene), stainless steel, and the like, which has corrosion resistance, high temperature resistance, high strength, easy assurance of filtration accuracy.

In this embodiment, a diameter of the lower through hole 252 is less than the minimum inner diameter of the protective corrugated tube 250. A lower connecting end 254 is arranged around the lower through hole 252. A first round nut 256 and a second round nut 257 are arranged on two sides of the lower connecting end 254, respectively. The first round nut 256 and the second round nut 257 are respectively threadedly connected with the conductive rod 220 to clamp the lower connecting end 254 so that the protective corrugated tube 250 is fixedly connected to the conductive rod 220. The protective corrugated tube 250 is fixedly connected to the conductive rod 220, on the one hand, there is no gap between the protective corrugated tube 250 and the conductive rod 220, so that impurities and metal chips in the protective corrugated tube 250 cannot enter the main insulating cavity; on the other hand, when the conductive rod 220 is deformed due to thermal expansion and cold contraction, and the protective corrugated tube 250 has a certain space for elastic deformation, and a size of the protective corrugated tube 250 is capable of changing accordingly with the deformation of the conductive rod 220, ensuring stable connections of the various components of the wall bushing 200.

In other embodiments, the protective corrugated tube and the conductive rod may be fixedly connected by welding, gluing, and other fixed connection, and the fixed connection between the protective corrugated tube and the conductive rod does not require tightness.

In this embodiment, the protective corrugated tube 250 is made of metal. The protective corrugated tube 250 made of metal can play a shielding role to a certain extent, improving the operation reliability of the wall bushing 200.

In other embodiments, the protective corrugated tube may be made of non-metallic material, as long as the generation of metal chips due to the secondary friction between the protective cover and the conductive rod can be prevented.

It can be understood that, in this embodiment, due to the arrangement of the protective corrugated tube 250, a cavity that only allows gas exchange and consists of the protective corrugated tube 250, the conductive rod 220, the transition plate 212 and the filter element 260, is formed. There is no gap between the protective corrugated tube 250 and the conductive rod 220, and even under the condition of not being sealed, only gas can be allowed to pass through. The passage 2532 and the filter element 260 are arranged between the protective corrugated tube 250 and the transition plate 212. The metal particles inside the protective corrugated tube 250 are blocked by the filter element 260 and cannot migrate to the outside of the protective corrugated tube 250. In such structure, there are no other outlets and inlets, which can ensure that the metal particles inside the protective corrugated tube 250 cannot enter the main insulating cavity of the wall bushing 200 during the process of inflating and deflating, thereby ensuring the operation reliability of the wall bushing 200. Moreover, due to the fixed connection between the protective corrugated tube 250 and the conductive rod 220, there is no displacement therebetween. When the conductive rod 220 is deformed due to thermal expansion and contraction, the size of the protective corrugated tube 250 is change accordingly, which ensures that the conductive rod 220 cannot be bent or the transition plate 212 cannot be deformed. The protective corrugated tube 250 is mainly used to provide a deformation space for the conductive rod 220 by the elastic deformation of the protective corrugated tube 250 itself.

In this embodiment, the threaded hole is arranged on the surface of the flange plate 253 attached to the transition plate 212, and the through hole corresponding to the threaded hole is arranged on the transition plate 212. The flange plate 253 and the transition plate 212 are threadedly connected by bolts. The threaded hole is arranged on the surface of the flange plate 253 attached to the transition plate 212 instead of the transition plate 212, which is for the sake of assembly, and such structure is more convenient for assembly. In this embodiment, an area of the conductive rod 220 located below the transition plate 212 is provided with threads, and the assembly sequence of the wall bushing 200 is as follows. After the other components are assembled, the second round nut 257 is sleeved downward from the head portion of the conductive rod 220, and is screwed onto the lower edge of the threaded area of the conductive rod 220 to prevent the second round nut 257 from loosening due to vibration and other reasons. And then, the protective corrugated tube 250 assembled with the filter element 260 is sleeved downward from the head portion of the conductive rod 220. The upper through hole 251 is located above, the lower through hole 252 is located below, and the lower connecting end 254 abuts against the second round nut 257. And then, the first round nut 256 is sleeved downward from the head portion of the conductive rod 220, and is screwed onto the conductive rod 220. The first round nut 256 abut against the lower connecting end 254. That is, the first round nut 256 and the second round nut 257 clamp two sides of the lower connecting end 254, so as to fix the protective corrugated tube 250 on the conductive rod 220. And then, the transition plate 212 is sleeved downward from the head portion of the conductive rod 220, the through hole on the transition plate 212 is matched with the threaded hole on the flange plate 253, and the transition plate 212 is fixedly connected to the flange plate 253 by passing the bolt through the through hole and screwing the bolt into the threaded hole. And then, the transition tank 211 is sleeved downward from the head portion of the conductive rod 220, and is fixedly connected to the transition plate 212. Finally, the connecting terminal 240 is connected to the transition tank 211, and the subsequent assembly is completed. During this process, the main body and the end part of the conductive rod 220 are enclosed in the main insulating cavity, if the bolt passes through the flange plate 253 first, and then through the transition plate 212, there is practical obstacles to the bolt connection. Therefore, the connection structure in this embodiment is more convenient for assembly.

Figure 8:
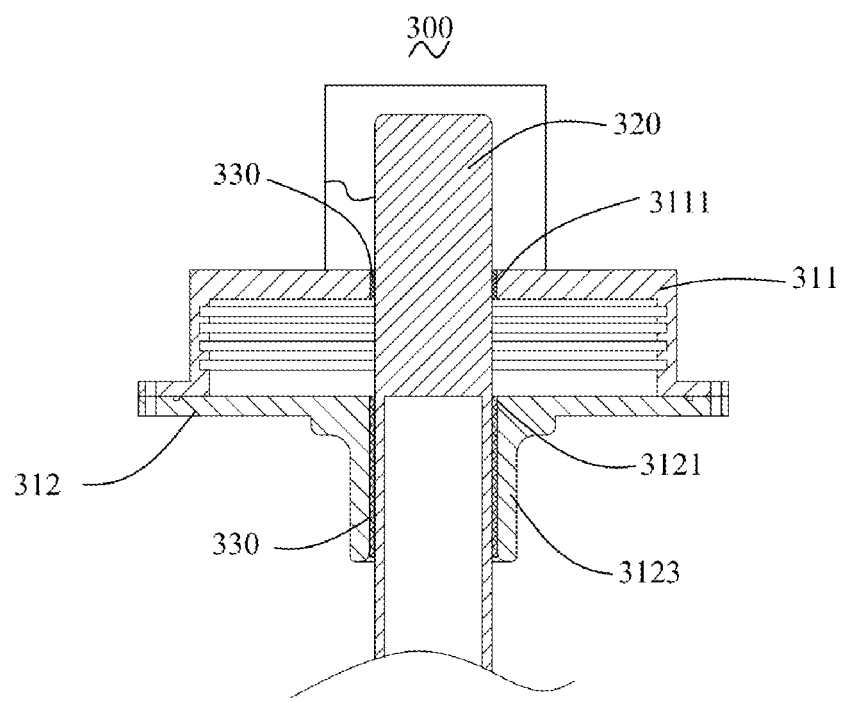
FIG. 8 is a partial cross-sectional view of a wall bushing 300 according to an embodiment of the present disclosure.
Figure 9:
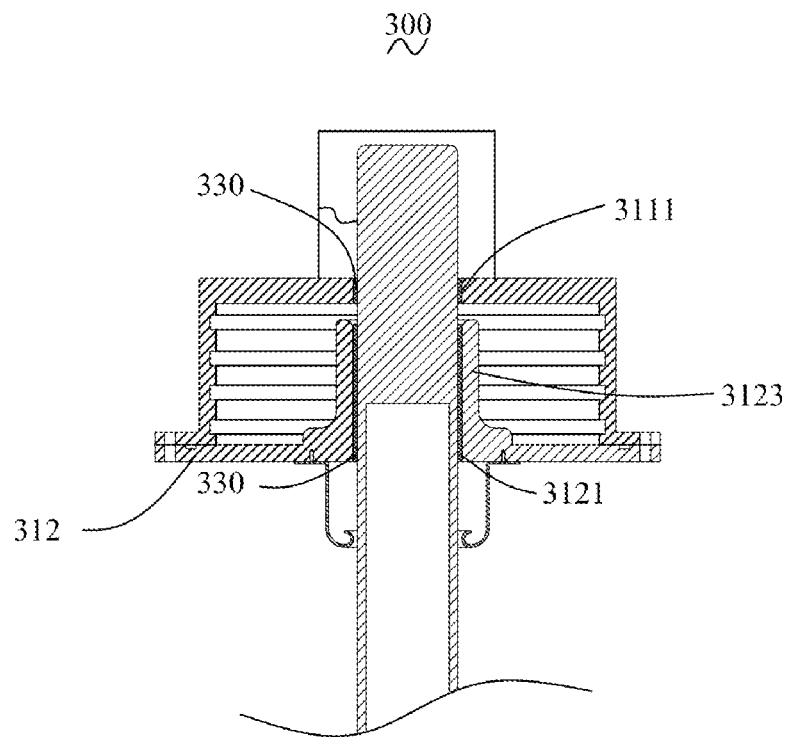
FIG. 9 is a partial cross-sectional view of a wall bushing 300 according to another embodiment of the present disclosure.
Figure 10:
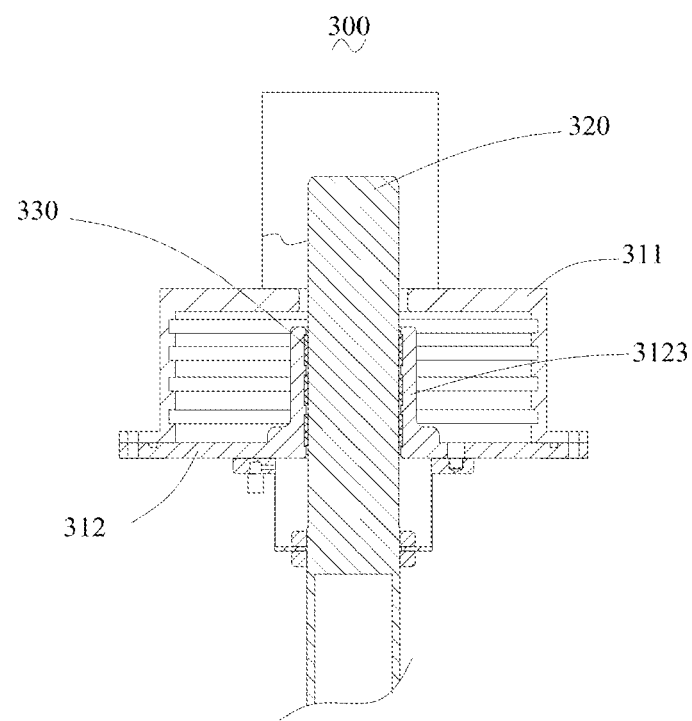
FIG. 10 is a partial cross-sectional view of a wall bushing 300 according to yet another embodiment of the present disclosure.

Further, in an embodiment, as shown in FIGS. 8 to 10, a non-metallic lining 330 is added to the wall bushing 300.

In an application scenario, as shown in FIG. 8, the non-metallic lining 330 is arranged on an inner wall of a first through hole 3111 and an inner wall of a second through hole 3121, which avoids metal particles from being generated by the friction between a conductive rod 320 and a transition plate 312, and between a conductive rod 320 and a transition tank 311, thereby improving the operation reliability of the wall bushing 300.

In other embodiments, the non-metallic lining may be arranged only on the inner wall of the first through hole or the inner wall of the second through hole.

In this embodiment, an inner wall of a protruding ring 3123 is provided with a non-metallic lining 330. The protruding ring 3123 is arranged on a lower surface of the transition plate 312. In other embodiments, the non-metallic lining may be arranged continuously in an area where the conductive rod contacts other metal conductors, or may be arranged in sections so that there is a gap between the conductive rod and other metal conductors, and the generation of metal particles can be reduced or even avoided in non-contact situations.

In another application scenario, as shown in FIG. 9, the inner wall of the first through hole 3111, the inner wall of the second through hole 3121, and the inner wall of the protruding ring 3123 are provided with a non-metallic lining 330, and the specific arrangements are the same as those described above, and which is not repeated herein. In this embodiment, the protruding ring 3123 is arranged on the upper surface of the transition plate 312.

In yet another application scenario, as shown in FIG. 10, the inner wall of the protruding ring 3123 is provided with a non-metallic lining 330. The non-metallic lining 330 prevents metal chips from being generated due to friction between the conductive rod 320 and the transition plate 312, and between the conductive rod 320 and the transition tank 311, thereby improving the operation reliability of the wall bushing 300. The inner wall of the protruding ring 3123 is provided with a plurality of grooves, and the non-metallic lining 330 is embedded in the grooves. Such structure can embed the non-metallic lining 330 in the grooves by adopting a broken ring form, that is, the non-metallic lining 330 is a strip structure, not a complete circle structure. A length of the non-metallic lining 330 can be adjusted according to sizes of the grooves, so that the non-metallic lining 330 is adapted to be embedded in the grooves, which is convenient for mounting and construction. In addition, arranging grooves reduces the amount of non-metallic lining 330 and reduces production costs. Compared to the non-metallic lining with larger area integrally arranged on the inner wall of the protruding ring 3123, the non-metallic lining 330 which is in the broken ring form and embedded in the inner wall of the grooves is easier to mount and fix, and the non-metallic lining 330 does not displace on the inner wall of the protruding ring 3123 during use. Alternatively, for the convenience of mounting, the non-metallic lining may have the structure as shown in FIGS. 8 and 9, that is, the non-metallic lining is integrally arranged on the inner wall of the protruding ring, and which is not limited herein.

In other embodiments, the non-metallic lining may be fixedly arranged on the conductive rod, that is, as long as the non-metallic lining is connected with the conductive rod, or any one of the inner wall of the first through hole, the inner wall of the second through hole, and the inner wall of the protruding ring. Alternatively, the non-metallic lining may be continuously arranged in the area of the conductive rod contacting other metal conductors, so that there is a gap between the conductive rod and other metal conductors, and the generation of metal particles can be reduced or even avoided in non-contact situations.

In this embodiment, the non-metallic lining 330 is a PTFE lining. The PTFE lining has good insulation and wear resistance, and good chemical corrosion resistance. During the operation of the wall bushing 300, if corrosive gas is generated due to the electric arc, the performance of the PTFE lining remains unaffected, ensuring that the non-metallic lining 330 is not worn and continues to be effective during the operation of the wall bushing 300 to the greatest extent.

In other embodiments, if the gas generated when the insulating gas filled in the wall bushing is subjected to the electric arc is non-corrosive gas or less corrosive gas, the non-metallic lining may be any one of a polyester lining, a glass fiber lining or the like, which has insulation and wear resistance.

The non-metallic lining 330 is arranged in the wall bushing 300 according to this embodiment, the contact between the conductive rod 320 and other metal conductors is reduced or avoided, the generation of metal particles is reduced, and the operation reliability of the wall bushing 300 is improved.

Figure 11:
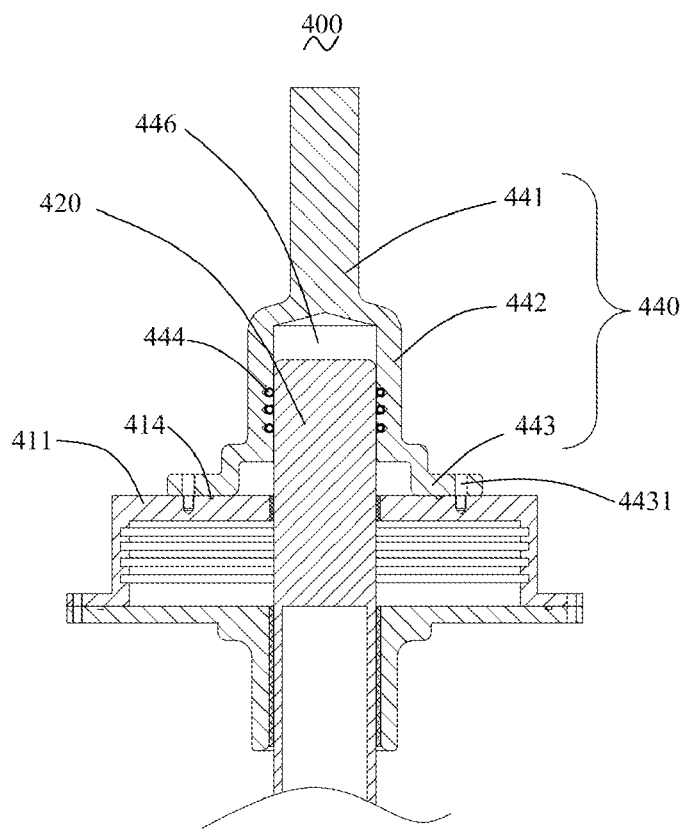
FIG. 11 is a partial cross-sectional view of a wall bushing 400 according to an embodiment of the present disclosure.
Figure 12:
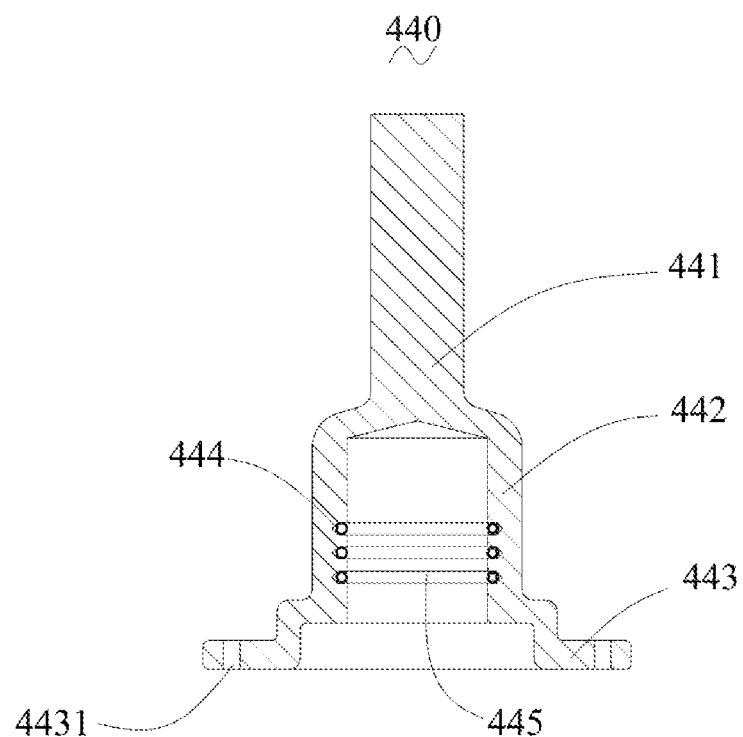
FIG. 12 is a cross-sectional view of a connecting terminal 440 according to an embodiment of the present disclosure.

Further, in an embodiment, as shown in FIGS. 11 and 12, a connecting terminal 440 and a wall bushing 400 including the connecting terminal 440 are provided. Specifically, the connecting terminal 440 of the wall bushing 400 includes a connecting part 441, an accommodating part 442 and a second connecting part 443 that are sequentially arranged. The accommodating part 442 is used for accommodating an end of a conductive rod 420 and is electrically connected to the conductive rod 420. The second connecting part 443 is in a sealed connection with an upper end of a transition tank 411. The connecting terminal 440 is an electrical connection component of the wall bushing 400 and is used for electrical connection with other devices. The arrangement of the second connecting part 443 facilitates the fixed connection of connecting terminal 440 to the transition tank 411.

In this embodiment, a second sealing groove 414 is arranged between the second connecting part 443 of the connecting terminal 440 and the upper end of the transition tank 411. A second sealing ring (not shown in figures) is arranged in the second sealing groove 414. Specifically, the second sealing groove 414 is arranged on the upper end of the transition tank 411. In other embodiments, the second sealing groove may also be arranged on the second connecting part, or, both the second connecting part and the upper end of the transition tank are provided with a sealing groove, and a sealing ring is mounted in the sealing groove.

In this embodiment, the second connecting part 443 is provided with through holes 4431, and the upper end of the transition tank 411 is correspondingly provided with threaded holes. The second connecting part 443 and the transition tank 411 are connected by passing screws (not shown in figures) through the through holes 4431 and screwing the screws into the threaded holes. In other embodiments, the second connecting part and the transition tank may be connected by gluing, welding, or a combination of the above fixed connections.

In this embodiment, contact springs 444 are arranged at an end of the conductive rod 420. The contact springs 444 abut against an inner wall of the accommodating part 442. There is a gap between the accommodating part 442 and the end of the conductive rod 420 in an axial direction of the conductive rod 420. The contact springs 444 are in close contact with the inner wall of the accommodating part 442 and the end of the conductive rod 420 at the same time, so that the electrical connection between the connecting terminal 440 and the end of the conductive rod 420 is stable, and thus the equipotential of the head assembly is maintained, and the heating problem of the head portion is solved. The gap 446 is formed between the accommodating part 442 and the end of the conductive rod 420 in the axial direction of the conductive rod 420, which can provide sufficient space for the conductive rod 420 to expand and contract when the conductive rod 420 undergoes axial deformation due to thermal expansion and contraction. That is, the deformation due to thermal expansion and contraction, of the conductive rod 420 can be absorbed, and the conductive rod 420 can be avoided from being bent due to fixed connection or contact with the inner wall of the accommodating part 442.

In this embodiment, a circular groove 445 is arranged on the inner wall of the accommodating part 442, and the contact springs 444 are accommodated in the circular groove 445. The contact springs 444 abut against an inner wall of the circular groove 445 and the end of the conductive rod 420, so that the accommodating part 442 is electrically connected to the end of the conductive rod 420, the equipotential of the head assembly is maintained, and the heating problem of the head is solved. In other embodiments, no circular groove may be arranged in the accommodating part, and there is a certain gap between the inner wall of the accommodating part and the end of the conductive rod, so that the contact springs can be pressed between the inner wall of the accommodating part and the end of the conductive rod. In this way, the contact springs can also be kept in a relatively fixed state.

Due to the ingenious structure arrangement of the connecting terminal 440, the wall bushing 400 according to this embodiment meets the electrical connection and equipotential requirements of the head of the wall bushing 400, while it is ensured the sufficient space for the conductive rod 420 to expand and contract when the conductive rod 420 is deformed in the axial direction due to thermal expansion and contraction. That is, the deformation due to thermal expansion and contraction of the conductive rod 420 can be absorbed, and the conductive rod 420 can be avoided from being bent due to fixed connection or contact with the inner wall of the accommodating part 442.

Figure 13:
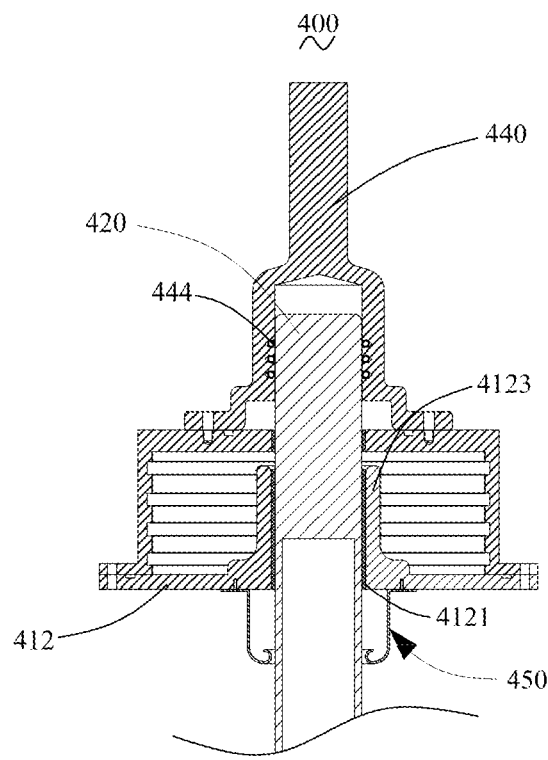
FIG. 13 is a partial cross-sectional view of a wall bushing 400 according to another embodiment of the present disclosure.

In an application scenario, as shown in FIG. 13, this embodiment adopts the aforementioned connecting terminal 440. Contact springs 444 are arranged between the connecting terminal 440 and the conductive rod 420, and the specific structure and the connection mode of the contact springs 444 are the same as those described above, which are not repeated herein. In this embodiment, a protruding ring 4123 is arranged on an upper surface of a transition plate 412, and a protective cover 450 is arranged at a lower end of a head assembly around a second through hole 4121.

Figure 14:
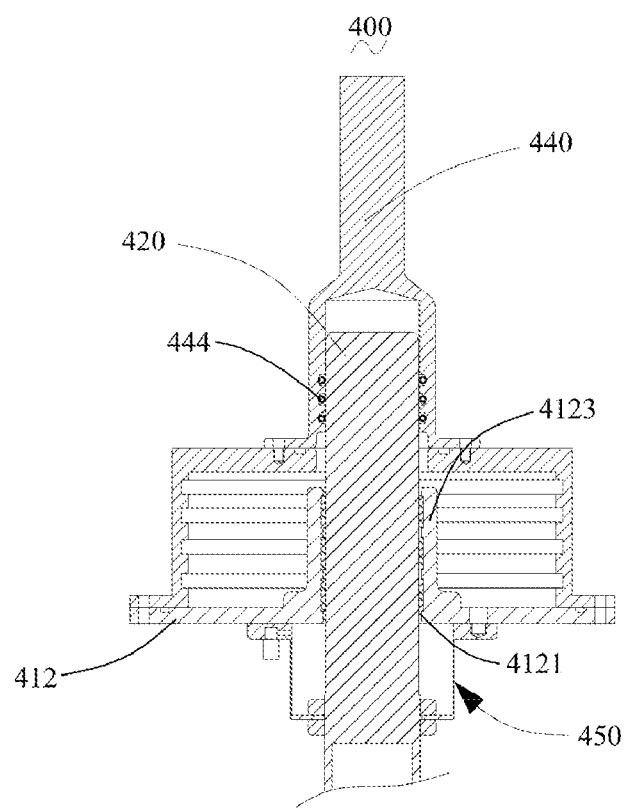
FIG. 14 is a partial cross-sectional view of a wall bushing 400 according to yet another embodiment of the present disclosure.

In yet another application scenario, as shown in FIG. 14, this embodiment also adopts the aforementioned connecting terminal 440, and contact springs 444 are arranged between the connecting terminal 440 and the conductive rod 420, and the specific structure and the connection mode of the contact springs 444 are the same as those described above, which are not repeated herein. In this embodiment, the protruding ring 4123 is arranged on the upper surface of the transition plate 412, and a protective corrugated tube 450 is arranged at the lower end of the head assembly around the second through hole 4121.

Figure 15:
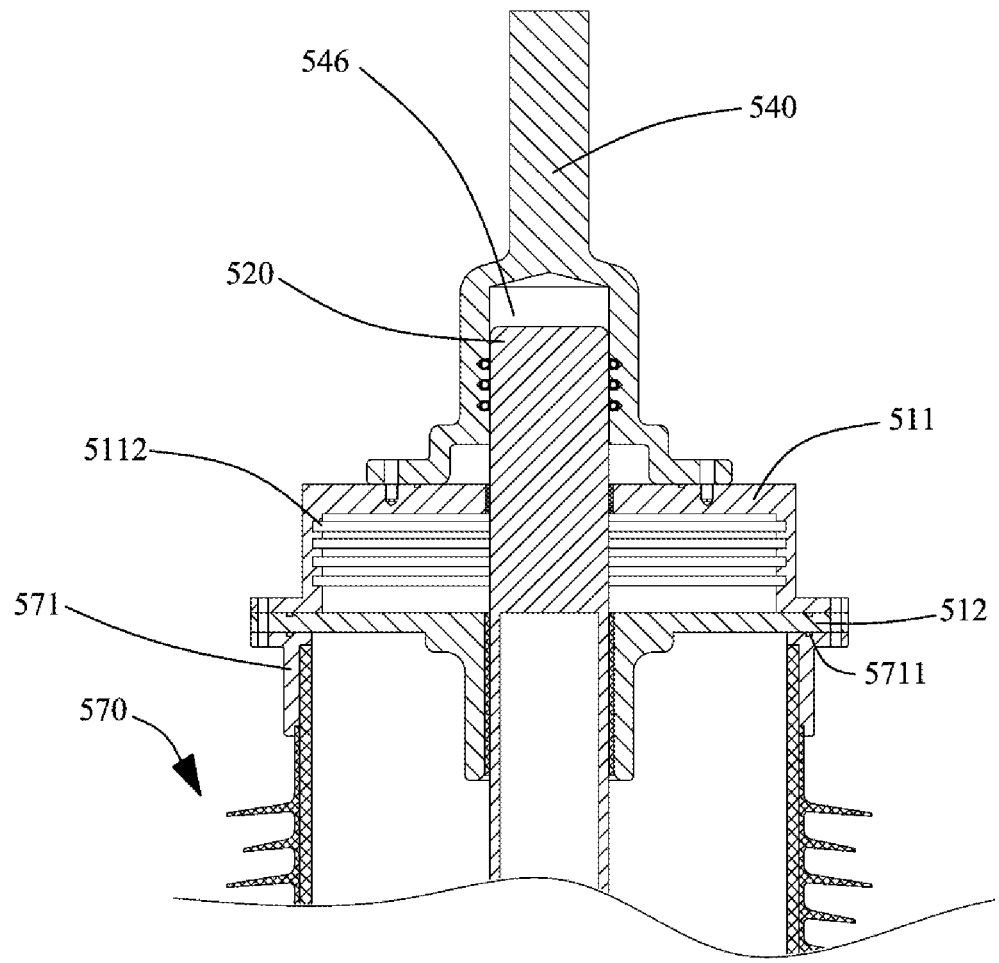
FIG. 15 is a partial cross-sectional view of a wall bushing 500 according to an embodiment of the present disclosure.
Figure 16:
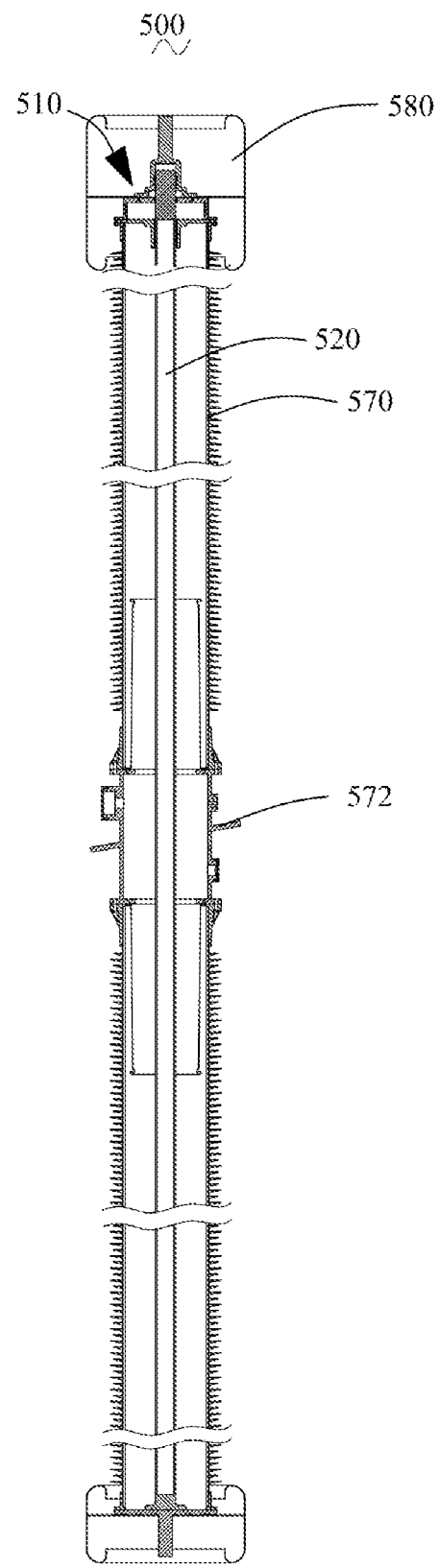
FIG. 16 is an overall cross-sectional view of the wall bushing 500 shown in FIG. 15.

Further, the present disclosure provides an embodiment shown in FIGS. 15 and 16, a wall bushing 500 includes a hollow insulator 570. A flange 571 of the hollow insulator 570 is in a sealed connection with a lower surface of a transition plate 512. The conductive rod 520 extends through the hollow insulator 570. The hollow insulator 570 provides insulation protection for conductors inside the wall bushing 500.

In this embodiment, a third sealing groove 5711 is arranged between the flange 571 of the hollow insulator 570 and the transition plate 512. A third sealing ring (not shown in figures) is arranged in the third sealing groove 5711. Specifically, the third sealing groove 5711 is arranged on the flange 571. In other embodiments, the third sealing groove may be arranged on the lower surface of the transition plate, or, both the flange and the lower surface of the transition plate are provided with a sealing groove, and a sealing ring is mounted in the sealing groove.

In this embodiment, a voltage equalizing ball 580 is arranged on an outer periphery of a head assembly 510. The voltage equalizing ball 580 is fixedly connected to the head assembly 510. The voltage equalizing ball 580 is used to equalize the voltage, so as to ensure that no abnormal corona discharge occurs when the head assembly 510 is charged. The terminal end of the wall bushing 500 is also provided with a voltage equalizing ball.

In this embodiment, the conductive rod 520 extends inside the hollow insulator 570 and is fixedly connected to the end of the wall bushing 500, which ensures that the conductive rod 520 extending through the head assembly 510 does not displace when the conductive rod 520 undergoes thermal expansion and contraction.

In this embodiment, specifically, the overall structure of the wall bushing 500 includes that the conductive rod 520 extends inside the hollow insulator 570 and is fixedly connected to the end of the wall bushing 500. Since the connecting terminal 540 and the transition tank 511 are in the sealed connection, the conductive rod 520 is only required to extend through the head assembly 510, and a fixed and sealed connection is not required between the conductive rod 520 and the transition tank 511 and between the conductive rod 520 and the transition plate 512. That is, the arrangement of an axial dynamic sealing device between the transition tank 511 and the conductive rod 520 is avoided, which greatly improves the sealing reliability of the wall bushing 500. In addition, the production cost is reduced due to the omission of a corrugated tube. When the length of the conductive rod 520 changes due to thermal expansion and contraction, since the end of the conductive rod 520 is fixed, the head portion of the conductive rod 520 and the transition tank 511 move relative to each other in the axial direction. In this case, a gap 546 between the connecting terminal 540 and the end of the conductive rod 520 provides a space for the axial movement of the head portion of the conductive rod 520, so that the conductive rod 520 does not bent due to the increase in length. From this aspect, the reliability of the wall bushing 500 is improved.

In this embodiment, the hollow insulator 570 is a composite insulator made of composite material. The composite insulator is light in weight, low in cost, and has excellent insulation and mechanical properties. In other embodiments, the hollow insulator may also be an insulator made of other materials, such as a porcelain insulator.

In this embodiment, the hollow insulator 570 includes two insulator sections. A mounting structure 572 is arranged between the two insulator sections. The mounting structure 572 is used to mounted the wall bushing 500 on the wall. That is, the wall bushing 500 includes the connecting terminal 540, the transition tank 511, the transition plate 512, and the hollow insulator 570 that are connected in sequence. The conductive rod 520 extends inside the hollow insulator 570. An end of the conductive rod 520 is connected to the connecting terminal 540, and the other end of the conductive rod 520 is fixed on the end of the hollow insulator 570.

When mounting the wall bushing 500, the wall bushing 500 may be mounted in a certain inclination angle, or horizontally in its axial direction. In this embodiment, the wall bushing 500 is mounted obliquely, and the head portion of the wall bushing 500 is higher than the end of the wall bushing 500. In this case, the metal particles existing in the transition tank 511 can fall into a circular groove 5112 due to gravity. The circular groove 5112 functions as a particle trap for absorbing the metal particles in the transition tank 511, which prevents the metal particles from floating and migrating in the transition tank 511, and ensures the stability of the electrical properties of the head portion of the wall bushing 500.

Figure 17:
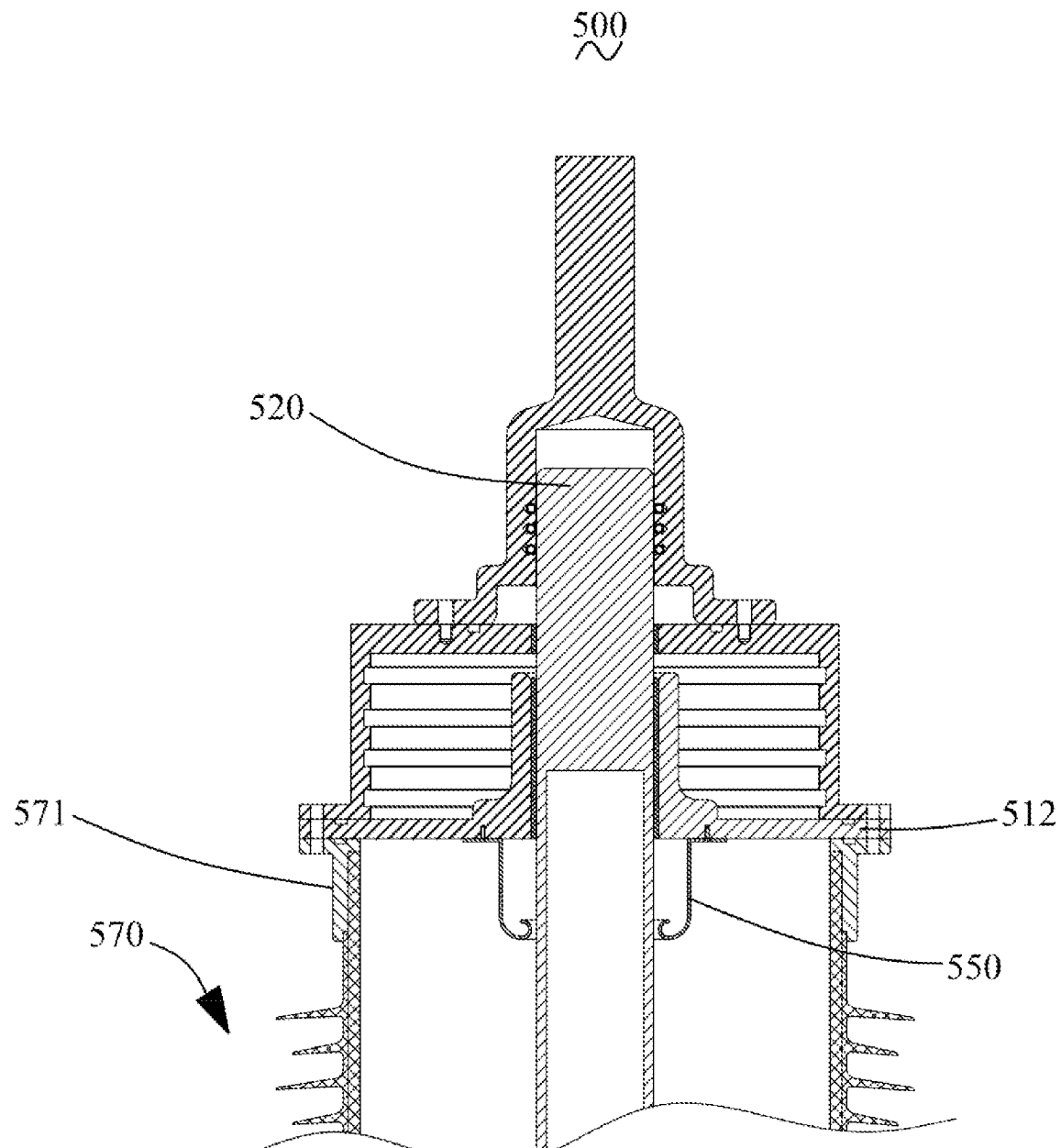
FIG. 17 is a partial cross-sectional view of a wall bushing 500 according to another embodiment of the present disclosure.
Figure 18:
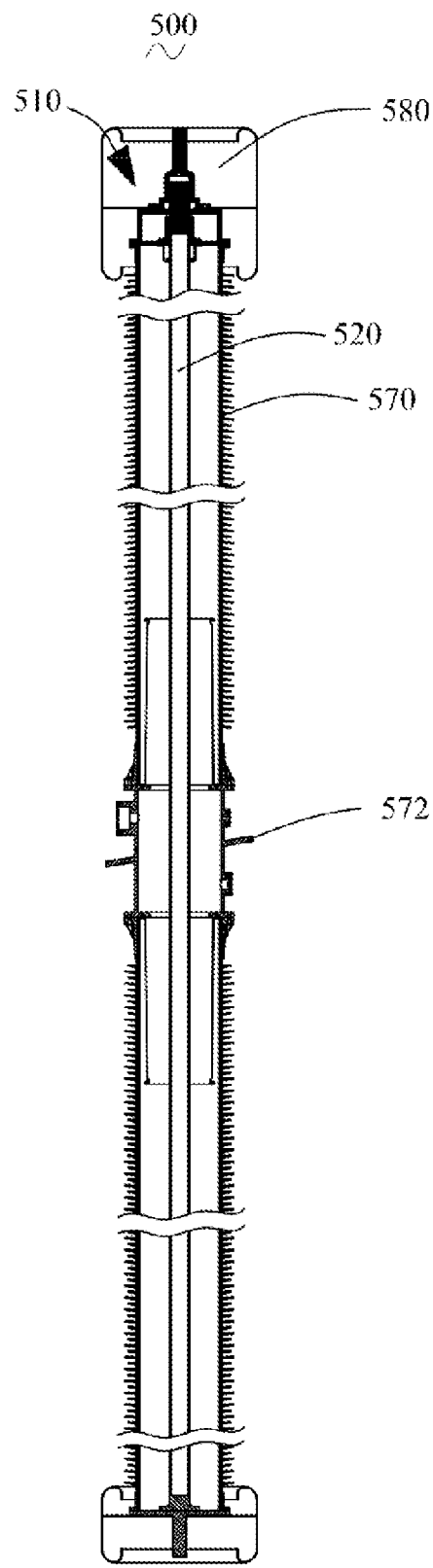
FIG. 18 is an overall cross-sectional view of the wall bushing 500 shown in FIG. 17.

In an application scenario, as shown in FIGS. 17 and 18, the wall bushing 500 also includes a hollow insulator 570. The flange 571 of the hollow insulator 570 is in a sealed connection with the lower surface of the transition plate 512. The conductive rod 520 extends through the hollow insulator 570. The hollow insulator 570 includes two insulator sections, and the mounting structure 572 is arranged between the two insulator sections. The specific connection mode of the mounting structure 572 is the same as those as described above, and which is not repeated herein. The outer periphery of the head assembly 510 is also provided with a voltage equalizing ball 580, and the specific connection mode is not repeated herein.

In this embodiment, due to the arrangement of the protective cover 550, a space is formed at the lower end of the transition plate 512 to prevent possible metal chips or other debris from entering the main insulating cavity of the wall bushing 500. The arrangement of the gap between the protective cover 550 and the conductive rod 520 prevents the generation of metal chips due to the secondary friction between the protective cover 550 and the conductive rod 520. The protective cover 550 made of metal plays a shielding role to a certain extent, which further improves the operation reliability of the wall bushing 500.

Figure 19:
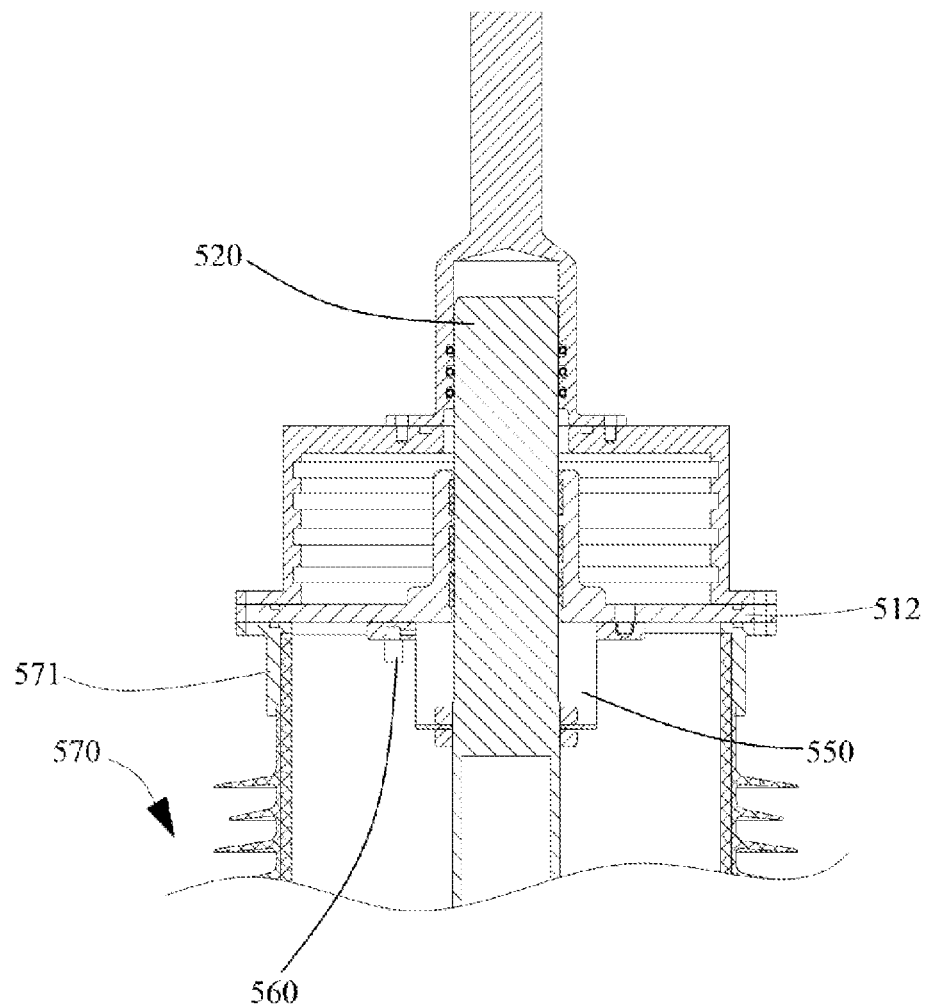
FIG. 19 is a partial cross-sectional view of a wall bushing 500 according to yet another embodiment of the present disclosure.
Figure 20:
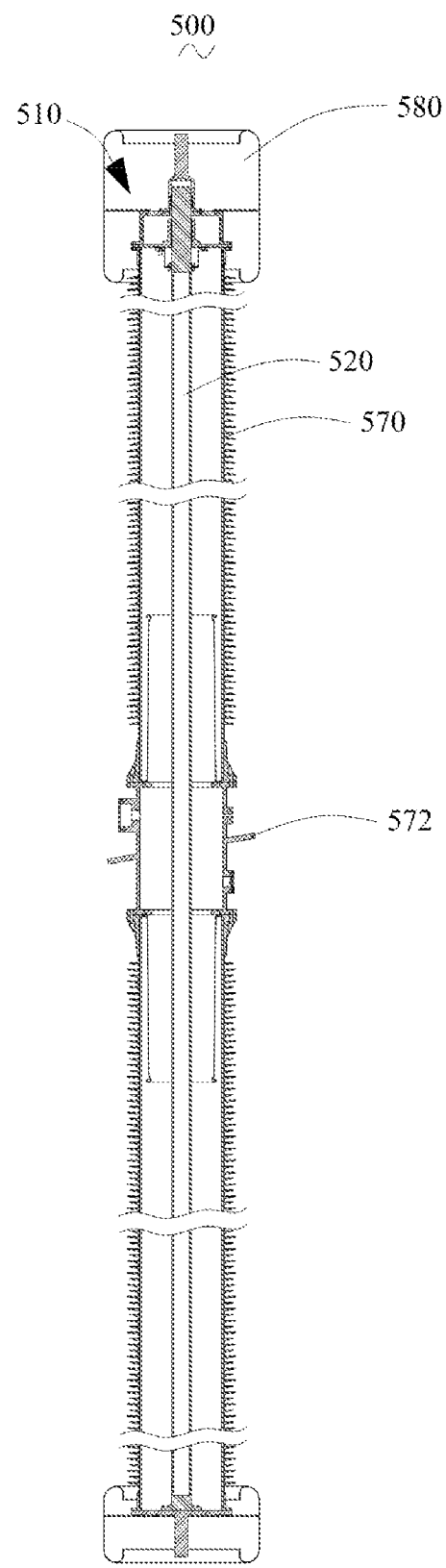
FIG. 20 is an overall cross-sectional view of the wall bushing 500 shown in FIG. 19.

In another application scenario, as shown in FIGS. 19 and 20, the wall bushing 500 also includes the hollow insulator 570. The flange 571 of the hollow insulator 570 is in a sealed connection with the lower surface of the transition plate 512. The conductive rod 520 extends through the hollow insulator 570. The hollow insulator 570 includes two insulator sections, and a mounting structure 572 is arranged between the two insulator sections. The specific connection mode of the mounting structure 572 are the same as those described above, and which is not repeated herein. The outer periphery of the head assembly 510 is also provided with a voltage equalizing ball 580, and the specific connection mode is not repeated herein.

In this embodiment, due to the arrangement of the protective corrugated tube 550, a cavity that only allows gas exchange and consists of the protective corrugated tube 550, the conductive rod 520, the transition plate 512 and the filter element 560, is formed. There is no gap between the protective corrugated tube 550 and the conductive rod 520, and even under the condition of not being sealed, only gas is allowed to pass through. The passage and the filter element 560 are arranged between the protective corrugated tube 550 and the transition plate 512. The metal particles inside the protective corrugated tube 550 are blocked by the filter element 560 and cannot migrate to the outside of the protective corrugated tube 550. In such structure, no other outlets and inlets are provided, which ensures that the metal particles inside the protective corrugated tube 550 cannot enter the hollow insulator 570 of the wall bushing 500 during the process of inflating and deflating, thereby ensuring the operation reliability of the wall bushing 500. Moreover, the protective corrugated tube 550 and the conductive rod 520 are fixedly connected, so that the protective corrugated tube 550 and the conductive rod 520 cannot be displaced relative to each other. When the conductive rod 520 is deformed due to thermal expansion and contraction, the size of the protective corrugated tube 550 changes accordingly, so as to ensure that the conductive rod 520 does not bent or the transition plate 512 is not deformed. The protective corrugated tube 550 is mainly used to provide a deformation space for the conductive rod 520 by the elastic deformation of the protective corrugated tube 550 itself.

The wall bushing according to the present disclosure has a simple structure, and the structure of the conventional corrugated tube is replaced by the head assembly, which avoids the use of an axial dynamic sealing device, greatly improves the sealing reliability of the wall bushing, and reduces production costs. The arrangement of the protective cover or the protective corrugated tube further prevents possible metal chips or other debris from entering the main insulating cavity of the wall bushing, thereby improving the operation reliability of the wall bushing.

Technical content of the present disclosure and technical characteristics have been disclosed as above, but it can be understood that, under the creative thought of the present disclosure, various modifications and improvements can be made to above-mentioned structures and materials by those skilled in the art, including a combination of technical features disclosed herein separately or claimed to be protected, and obviously including other combinations of these features. These variants and/or combinations all fall within the technical field involved in the present disclosure, and fall within the protection scope of the claims of the present disclosure.

What is claimed is:

1. A wall bushing, comprising:
a head assembly;
a conductive rod; and
a connecting terminal sealing and covering the head assembly and the conductive rod,
wherein the connecting terminal is electrically connected to the conductive rod, the head assembly includes a transition tank and a transition plate that are connected to each other,
wherein an upper end of the transition tank is provided with a first through hole, and a lower end of the transition tank is hole-through, and
wherein the transition plate is provided with a second through hole, the conductive rod extends through the first through hole and the second through hole, the transition tank and the transition plate are fixedly connected so that an accommodating cavity is formed around the conductive rod and in the transition tank,
the wall bushing further includes a protective corrugated tube,
wherein the protective corrugated tube is a ring-shaped casing that is hole-through in an up-down direction, the protective corrugated tube is provided with an upper through hole and a lower through hole, the conductive rod extends through the first through hole, the second through hole, the upper through hole, and the lower through hole, the protective corrugated tube is provided with an upper connecting end around the upper through hole, the upper connecting end surrounds the second through hole and is fixedly connected to a lower end of the head assembly; and the lower through hole is fixedly connected to the conductive rod.

2. The wall bushing of claim 1, wherein the upper connecting end is a flange plate extending along a radial direction of the upper through hole, and the flange plate is attached to and fixedly connected to the lower end of the head assembly.

3. The wall bushing of claim 2, wherein a mounting hole is arranged on the flange plate, a passage is arranged between the mounting hole and the upper through hole for providing a communication of the mounting hole with the upper through hole, a filter element is mounted in the mounting hole, and the filter element is configured for only gas exchange between an inside of the protective corrugated tube and an outside of the protective corrugated tube.

4. The wall bushing of claim 1, wherein a diameter of the lower through hole is less than a minimum inner diameter of the protective corrugated tube, a lower connecting end is arranged around the lower through hole, a first round nut and a second round nut are arranged on two sides of the lower connecting end, and the first round nut and the second round nut are respectively threadedly connected with the conductive rod to clamp the lower connecting end, so that the protective corrugated tube is fixedly connected to the conductive rod.

5. The wall bushing of claim 1, wherein a plurality of circular grooves is arranged on a sidewall of the transition tank and surrounds the conductive rod.

6. The wall bushing of claim 1, wherein the lower end of the transition tank extends to form a first connecting part along an outer periphery of the transition tank, and the first connecting part is in a sealed connection with the transition plate.

7. The wall bushing of claim 1, wherein a non-metallic lining is arranged on an inner wall of the first through hole and/or an inner wall of the second through hole.

8. The wall bushing of claim 1, wherein the connecting terminal includes a connecting part, an accommodating part, and a second connecting part that are sequentially arranged, the accommodating part is configured for accommodating an end of the conductive rod, and is electrically connected to the conductive rod, and the second connecting part is in a sealed connection with the upper end of the transition tank.

9. The wall bushing of claim 8, wherein contact springs are arranged at the end of the conductive rod, the contact springs abut against an inner wall of the accommodating part, and a gap is formed between the accommodating part and the end of the conductive rod in an axial direction of the conductive rod.

10. The wall bushing of claim 1, wherein an upper surface and/or a lower surface of the transition plate is provided with a protruding ring around the second through hole.

11. The wall bushing of claim 1, further comprising a hollow insulator, wherein the hollow insulator is in a sealed connection with the transition plate, and the conductive rod extends through the hollow insulator.

* * * * *